United States Patent [19]

Reinhardt et al.

[11] Patent Number: 5,431,412
[45] Date of Patent: Jul. 11, 1995

[54] SEALING ELEMENT

[75] Inventors: Paul A. Reinhardt; William M. Richards; Daniel E. Dinhoble, all of Houston, Tex.

[73] Assignee: Baker Hughes Incorporated, Houston, Tex.

[21] Appl. No.: 32,137

[22] Filed: Mar. 17, 1993

[51] Int. Cl.⁶ ............................................. F16J 15/10
[52] U.S. Cl. ..................................... 277/1; 277/116.2; 277/123; 277/188 R; 166/196
[58] Field of Search ............... 277/1, 116.2, 116.8, 277/117, 123, 188 R; 166/196, 192, 179

[56] References Cited

U.S. PATENT DOCUMENTS

| | | |
|---|---|---|
| 4,281,840 | 8/1981 | Harris . |
| 4,700,954 | 10/1987 | Fischer . |
| 4,720,113 | 1/1988 | Hertz, Jr. . |
| 4,852,649 | 8/1989 | Young . |
| 5,054,824 | 10/1991 | Wyss . |
| 5,096,209 | 3/1991 | Ross . |

Primary Examiner—William A. Cuchlinski, Jr.
Assistant Examiner—Scott W. Cummings
Attorney, Agent, or Firm—Rosenblatt & Redano

[57] ABSTRACT

The invention comprises a uniquely shaped sealing element or elements for a packer. In an application using a stack of elements, the upper element is configured so that at least a portion of its inside diameter represents an interference fit with the mandrel onto which it is mounted. A built-in moment within the packing element occurs as a result of the partial interference fit. Additionally, a taper is provided which, in effect, shifts the point of contact of the upper element closer to a central element, tending to better give extrusion support to the central element. The taper also facilitates the creation of a resistive moment which fights the tendency of the upper element to extrude in the upper outermost corner of the upper element, for example. The central element can also be installed on a mandrel with interference throughout its length to create a built-in radial force urging the element back into its original shape after it is expanded and allowed to relax. Using such shapes, the need to mechanically stretch the elements longitudinally, after they are relaxed so that the packer can be withdrawn without interference in a close running situation, is eliminated.

24 Claims, 2 Drawing Sheets

PRIOR ART

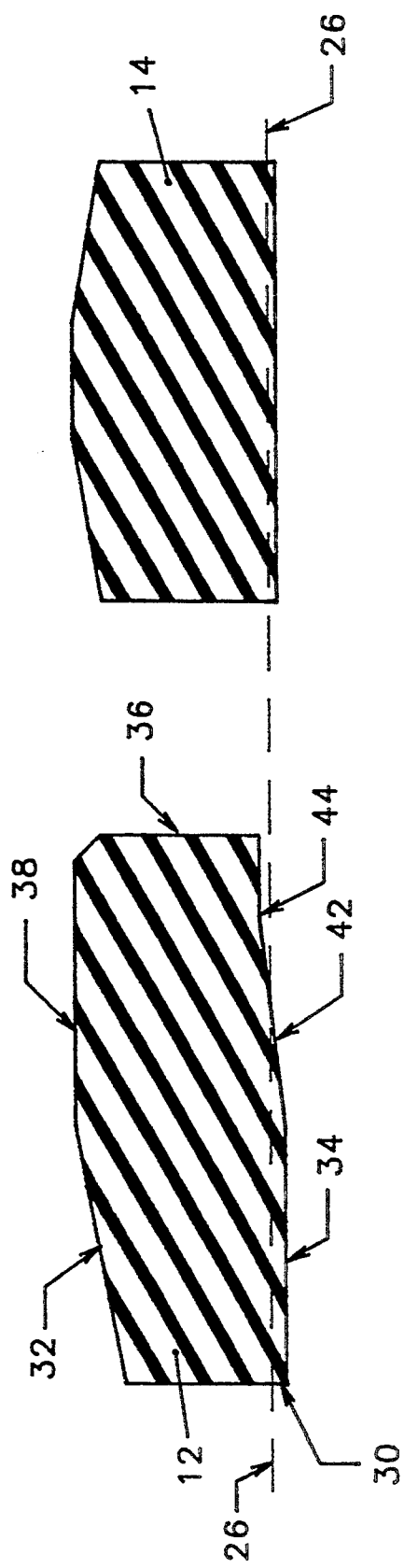

SEALING ELEMENT

FIELD OF THE INVENTION

The invention relates to sealing elements, particularly for downhole packers.

BACKGROUND OF THE INVENTION

In the past, stacks of sealing elements have been used in packers to obtain a seal against the casing or tubing or wellbore. The packing elements are generally stacked next to each other and either abut each other or are spaced apart by booster sleeves or annular rings. As a result, the packing element in the center is hemmed in from above and below by an upper and lower element. One of the main problems with packing elements, especially where the radial distance to seal is significant, is the problem of extrusion. The central element in a three-element stack is generally less prone to extrusion because it is more fully supported from above and below and experiences similar support against extrusion from the upper and lower elements.

Many applications require insertion of a packer in a confined space where, in order to clear internal obstructions, it is important for the elements after the packer is released to return to their original shape as much as is possible. In that sense, the "memory" of the elements is significant because if the elements, once expanded for sealing, do not closely come back to their original shape, problems could ensue in trying to remove the packer. Some prior art packers have applied longitudinal tensile forces to get the elements to reassume their original shape as closely as possible. With the current methods where such packers are being placed in and retrieved from the tubing or wellbore by a wireline or electric line, there is a limited tensile force that can be applied to remove a packer after it has been set and released. Any deformation of the elements after they have been compressed and then released, resulting in portions of the elements sticking out radially, can cause sticking or jamming of the packer. Due to the limited tensile forces that can be put on a wireline or electric line, the packer may become stuck and require time-consuming fishing operations in order to be retrieved. Passing through other restrictions, such as subsurface safety valves, may cause them to malfunction if the packer is hung.

In the past, the tendency of the elements, particularly the upper and lower in a stack of three, to extrude has been recognized. Various techniques have been employed to minimize the extrusion tendencies of the outer sealing members in a stack of elements on a packer. Metal bands have been put on the uppermost surface of the top element and the lowermost surface of the lower element as a means for limiting the extrusion effect. Reinforcing bands, placed strategically in the uppermost corner of the upper element and likewise in the lower and outermost corner of the lower element, have also been used as extrusion prevention techniques. Typical of such techniques are U.S. Pat. Nos. 4,852,649 and 5,096,209.

The problem with these attempts to stiffen the corner of the upper and lower sealing elements, internally or externally, is that they only have met with marginal success. From the perspective of adding stiffening bands, for example, to the outer corner of the upper sealing element, the problem is that after the element is compressed the metal stiffening element does not have shape memory and remains in an extended position. Thereafter, it creates problems for removal of the packer if a wireline or electric line is used. In the past, using tubing to install or remove the packer, significant tensile forces could be applied to the packer to overcome the stiffness of the support rings which have been bent or forced into an interfering position. However, by use of an electric line or wireline, the engagement of these stiffening members with the tubing or casing could present resistance to extraction which exceeds the tensile limits of the electric line or wireline.

Another problem that has been encountered is that the deformation of the elements, particularly the upper element, occurs to such an extent and is so placed as to also offer a potential catchpoint in a narrow clearance installation, thereby impeding efforts to remove the packer after it is released. Experience has shown that prior art designs that use three symmetrical packing elements have an upper element which deforms and leaves a significant knot which sticks out significantly beyond the upper gauge ring and presents a hard catchpoint when trying to remove the packer after the elements have been released.

Accordingly, it is desirable to design packing elements that, inherently and without the aid of extraneous stiffening elements, tend to recover to their original shape as much as possible. Additionally, as disclosed in the apparatus of the present invention, it is desirable to configure the packer elements in such a way as that they have preprogrammed within them, upon assembly, built-in forces which tend to limit extrusion and further limit development of knots, which have been the experience when using symmetrically cross-sectioned elements in a stack on a packer. Accordingly, one of the objects of the present invention is to design a packing element that is so shaped so as to resist extrusion. Another object of the invention is to provide a packing element shape for an upper and lower element which take into account the uneven loading seen by those elements and due to configuration promote the ability of the upper and lower elements to contain the central element. Another object of the invention is to configure the upper and lower elements in such a way as to resist their tendency to extrude.

SUMMARY OF THE INVENTION

The invention comprises a uniquely shaped sealing element or elements for a packer. In an application using a stack of elements, the upper element is configured so that at least a portion of its inside diameter represents an interference fit with the mandrel onto which it is mounted. A built-in moment within the packing element occurs as a result of the partial interference fit. Additionally, a taper is provided which, in effect, shifts the point of contact of the upper element closer to a central element, tending to better give extrusion support to the central element. The taper also facilitates the creation of a resistive moment which fights the tendency of the upper element to extrude in the upper outermost corner of the upper element, for example. The central element can also be installed on a mandrel with interference throughout its length to create a built-in radial force urging the element back into its original shape after it is expanded and allowed to relax. Using such shapes, the need to mechanically stretch the elements longitudinally, after they are relaxed so that the packer can be withdrawn without interference in a close running situation, is eliminated.

BRIEF DESCRIPTION OF THE DRAWINGS

FIG. 3 (in quarter section) illustrates schematically the shape of the upper or a lower element prior to mounting it on a mandrel, illustrating schematically the amount, placement, and degree of interference in the assembly.

FIG. 4 (in quarter section) is similar to FIG. 3 but illustrates a typical central element in a stack involving upper, central, and lower elements.

DETAILED DESCRIPTION OF THE PREFERRED EMBODIMENT

Figure 1A:
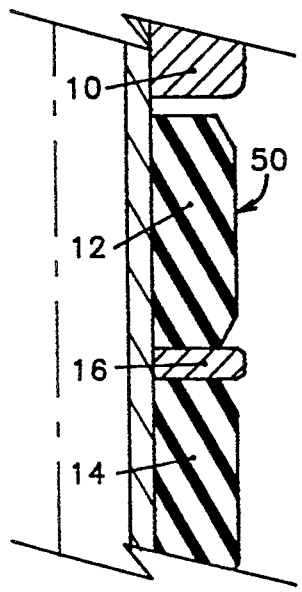
FIG. 1 (in quarter section), parts a, b, and c, illustrate the prior art's symmetrically constructed stack of sealing elements, generally using middle, upper, and lower elements with a gauge ring at the top to apply a longitudinal force to urge the sealing members into contact with the surface to be sealed.
Figure 1B:
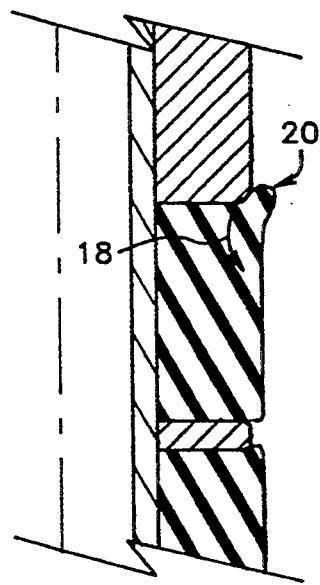

The prior art is schematically illustrated in FIG. 1. There, a typical packer assembly would have an upper gauge ring 10. Typically, the gauge ring is translated through mechanical, hydraulic, or a combination of mechanical or hydraulic effects to move downwardly, as shown in FIG. 1b, causing the upper element 12, the middle element 14, and the lower element (not shown) to be compressed. The longitudinal compressive force applied results in outward expansion of the elements 12 and 14 into contact with the tubing, casing, or wellbore, as the case may be. Prior designs have also incorporated backup rings 16, which can be fiat, annularly shaped discs which are placed over a mandrel (not shown) to separate the elements, such as 12 and 14. Alternatively or additionally, booster sleeves have been used to provide support for one or more of the elements, such as 12 or 14.

Figure 1C:
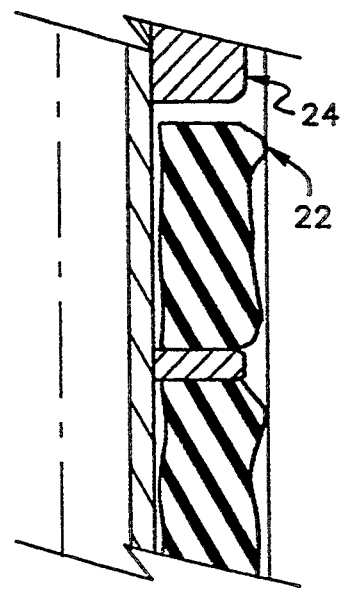

One of the drawbacks of prior designs is the use of symmetrically cross-sectioned elements for the sealing elements 12 and 14, as well as the lower element (not shown). Experience shows that while the set force applied is uniform, the stress applied on the three elements is not. The most likely element to experience symmetrical stresses is the central element 14 which has disposed on either side the upper element 12 or lower element (not shown). The upper element 12 experiences more uneven stress loading. As a result in the past, when the gauge ring 10 is moved downwardly, putting a longitudinal compressive force on the elements, a moment is created shown in the direction of arrow 18 in FIG. 1b. Responsive to the applied moment in the direction of arrow 18, the elements, which can be rubber or some other flexible material, begin to flex and tend to extrude under load, as shown in FIG. 1b. While still under load, the element 12 tends to elongate at its upper end in the shape generally referred to as 20. When the load is removed by upward movement of gauge ring 10, the element 12 does not spring back to its original shape. Instead, a lump 22 which can be rigid now becomes part of the profile of the upper element 12. In the past this has not been that great a concern when the packer is run in and out on tubing. However, if the packer is run in and out on wireline or electric line, there is a limited amount of force that can be applied to extract the packer after the element 12 is allowed to relax due to return movement of the gauge ring 10, as shown in FIG. 1c. More recently, some applications involve very narrow clearances. The landing nipples, which can be part of a string through which the packer is run, do not provide for significant clearance beyond the outer face 24 of the gauge ring 10. Accordingly, if the elements take on a deformed shape, as illustrated in FIG. 1c by knot 22, difficulty is encountered in removal of the packer with wireline or electric line. This phenomenon is not as big a concern with the central element 14 since it is surrounded by the upper element 12 and the lower element (not shown). However, a similar situation is presented with the lower element (not shown) as with the upper element 12. In both situations, the potential for the creation of a knot 22 is present. This is due to the limited support for the upper element 12 or the lower element (not shown) since both those elements abut portions of the packer on one end.

The elements used in the past have had some "memory." That is to say, they have had some tendency to resume their original shape after a cycle of load and removal of load. However, the memory of most materials used for sealing elements in packers has and continues to be far from perfection. Accordingly, once a packing element, such as the upper element 12, has experienced a cycle of loading and unloading, it does not go back to its original installed shape.

Figures 2A, 2B:
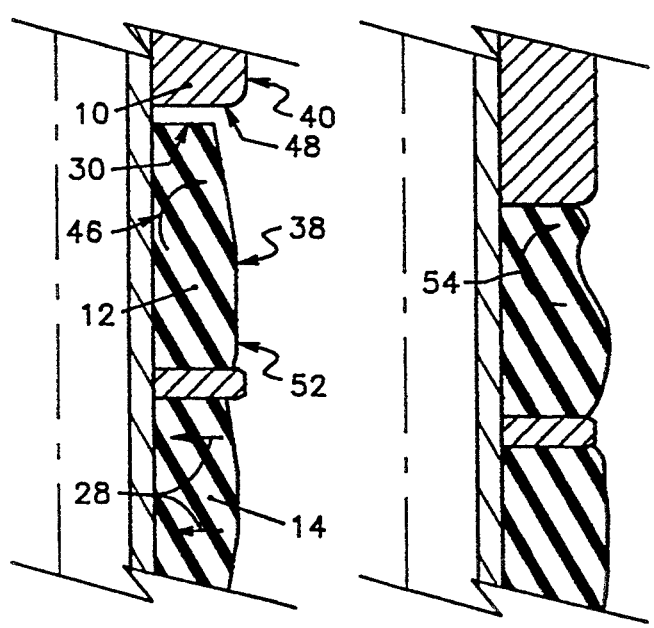
FIG. 2 (also in quarter section) represents the apparatus of the present invention, showing the uniquely shaped elements mounted to a mandrel for use.

One of the features of the present invention has been to facilitate or improve the "memory" of sealing elements used on packers. To this end, the concept of interference fit is introduced to the elements, such as 12 or 14. Referring now to FIG. 4, a typical middle element 14 is schematically illustrated. The dashed line 26 illustrates the mounting surface for the element 14. The portion of the middle element 14 extending below line 26 represents schematically the degree of interference in the fit of element 14 onto the seal gland or mandrel which is represented by line 26. This interference can be as much as about 30% of the cross-sectional thickness of element 14. In essence, when an element which is tubularly shaped, such as 14, is fitted over the seal gland or mandrel 26, the degree of interference provided creates radially inward forces which tend to draw back the element, such as 14, to its original shape. The stresses built into the element 14 due to the interference fit are what accounts for this radial inward force as the element, having been forced onto the seal gland or mandrel 26, tries to resume its original shape. Accordingly, a net radial inward force acts on the element 14, even in the relaxed state, as shown in FIG. 2a by arrows 28. Since the middle element 14 generally is symmetrically loaded from elements above and below, the interference is preferably equivalent through its length, as shown in FIG. 4.

The upper element 12 or the lower element (not shown) typically does not have even loading. As previously stated, prior designs have produced a counterclockwise moment, indicated by arrow 18, while a load has been applied, as shown in FIG. 1b. This counterclockwise moment results in the extrusion, or a tendency to extrude, of upper element 12 and the subsequent formation of the knot 22. Referring now to FIG. 3, an upper element 12 of the present invention is illustrated. The upper element 12 has a top surface 30 and a sloping surface 32. It has a partially interfering segment 34, which-in the preferred embodiment does not extend for the entire length of the upper element 12. The bottom surface 36 typically would abut a backup ring such as 16 or the middle element 14 directly. Bottom surface 36 has a greater cross-sectional area than top surface 30. The radial outward extension of surface 38 is close to alignment with surface 40 of upper gauge ring 10, as shown in FIG. 2a. It must be kept in mind that FIG. 3 is a schematic representation of the preferred embodiment of upper element 12 of the present invention. As can readily be seen, the interference fit of element 12 shown in FIG. 3, with respect to the seal gland or mandrel mounting surface 26, is not uniform across its longitudinal length. Instead, a taper 42 ends at a point 44 short of bottom surface 36. While a taper 42 is shown, an abrupt step can be used. However, in the preferred embodiment and for ease of manufacturing, a tapered surface is preferred. Those skilled in the art will appreciate that by use of partial interference along the upper end of element 12, as shown in FIG. 3, a net clockwise moment is imparted to element 12 when forced onto seal gland or mandrel surface 26. This built-in clockwise moment is illustrated by arrow 46 in FIG. 2a. This clockwise moment resists extrusion forces imparted by the gauge ring 10 shown schematically as arrow 18.

In the preferred embodiment, a tapered surface 32 is used that does not extend the entire length of element 12. The preferred angle for taper 32 is between about 0°–20°. As shown in FIG. 2a, upper surface 30 is preferably about as long as the straight section 48 of the bottom of gauge ring 10, with surface 38 extending about as far out as surface 40. Reducing the size of upper surface 30 in combination with taper 32 helps minimize extrusion over adjacent gauge ring 10.

Figure 2C:
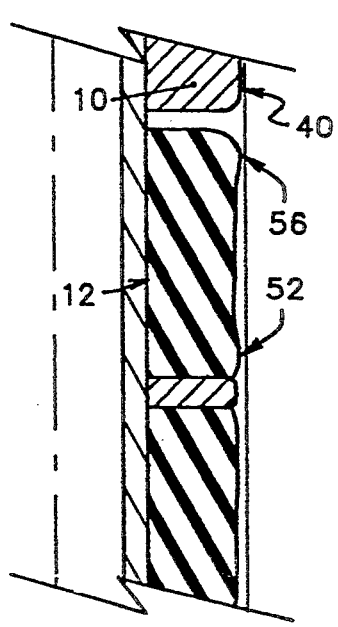

With the partial interference fit of upper element 12 in the manner as shown in FIG. 3, the clockwise moment illustrated by arrow 46 works against the counterclockwise moment created by compression from gauge ring 10, as illustrated by arrow 18 on FIG. 1b. The deformation pattern of the upper element 12 of the preferred embodiment is shown in FIGS. 2b and c. Referring to FIG. 2b, the asymmetrical shape of upper element 12 affects the way that element 12 seals against the tubing, casing, or wellbore. Comparing the prior art upper element 12, shown in FIG. 1a, which is of symmetrical construction, it has an initial point of contact 50 close to its center. However, the asymmetrical design of the upper element 12 of the present invention shifts the point of contact 52 (see FIG. 2a) to a point lower down on upper element 12. This has several effects. The central element 14 is better retained due to the shifting of the initial contact point 52 closer to element 14. Thus, the forces in element 12 adjacent its lower end are more properly directed downwardly toward element 14 to oppose any tendency of element 14 to extrude under load. Additionally, by shifting the primary contact point 52 to the lower end and by providing little or no interference in the fit of upper element 12 adjacent its lower end, loading also tends to promote the creation of a clockwise moment, as represented by arrow 54 in FIG. 2b. Partly as a result of the uneven interference fit and the asymmetrical shape, the upper element 12 is less likely to deform in the manner shown in FIG. 1b and c. The ultimate shape that element 12 takes after the gauge ring 10 is retracted is shown in FIG. 2c. There is a slight extrusion peak 56, but it does not extend substantially beyond surface 40. This is also due in part to surface 30 being smaller than the cross-section of gauge ring 10. With the shifting of the sealing load toward point 52, the profile after relaxation at the lower end of upper element 12 also does not extend substantially beyond the surface 40 of gauge ring 10. Furthermore, the interference fit also helps to improve the memory of the upper element 12 to go back to its original position. This effect is felt more extensively near its upper end adjacent surface 30.

It should be understood that while the discussion of the preferred embodiment has focused on element 12 as the upper element, equal considerations are applicable to the lowermost element (not shown), which is preferably mounted as a mirror image of upper element 12 on the other side of central element 14.

The amount of interference built into any of these elements is a function of their diameter and the hardness of the material. Typically, the upper element 12 can be 90 durometer hardness before assembly and middle element 14 can be about 80 durometer hardness before assembly.

Referring now to FIGS. 3 and 4, a preferred embodiment has been developed for element 12 designed to mount on a shaft having an outside diameter of between 4.457 and 4.460 inches. The outside diameter of element 12 adjacent surface 30 is 5.135 inches, while the inside diameter at surface 34 is between 4.250 and 4.280 inches. The taper at surface 42 is at 7° from the longitudinal axis, while the taper at surface 32 is at 11° from the longitudinal axis. The inside diameter adjacent surface 36 is 4.473 inches, while the outside diameter at surface 38 is 5.525 inches. The overall length is 1.870 inches, while the segment from point 44 to surface 36 is 0.25 inch. Element 14 is designed to go on the same size shaft and has an inside diameter of 4.360–4.390 inches, an outside diameter of 5.570 inches, and tapers on its outer face at 10° from the longitudinal axis, with an overall length of 1.470–1.5 inches.

The foregoing disclosure and description of the invention are illustrative and explanatory thereof, and various changes in the size, shape and materials, as well as in the details of the illustrated construction, may be made without departing from the spirit of the invention.

We claim:

1. A sealing element for a packer, mountable to a mounting surface on the packer having a radial diameter, comprising:
    a flexible tubular body having a bore therethrough and a top and bottom end;
    said tubular body having at least one external sealing surface;
    said bore sized so that the majority of the length of said bore in said tubular body is smaller than the radial diameter of the mounting surface, requiring an interference fit over the majority of said bore to mount said tubular body onto the mounting surface to build in a moment in said body from said interference to resist extrusion upon compression.

2. The sealing element of claim 1, wherein:
    substantially the entirety of said bore in said tubular body has a smaller diameter than the mounting surface;
    said interference fit over the substantial length of said bore, creating internal forces within said tubular body oriented substantially toward the mounting surface.

3. The sealing element of claim 1, wherein the longitudinal cross-section of said tubular body increases without subsequently decreasing from said top to said bottom ends.

4. A sealing assembly for a packer, comprising of at least two elements acting in tandem and actuable into a sealing mode by the application of a longitudinal force, comprising:
 a compressing element;
 a main sealing element;
 a backup sealing element;
 said compressing element selectively applying a longitudinal force on said backup sealing element;
 said backup sealing element transferring said longitudinal compressive force to said main sealing element;
 said compressing element having a first radial thickness adjacent said backup sealing element;
 said backup sealing element when mounted to the packer having a longitudinally asymmetrical cross-section with its smallest radial thickness adjacent said first radial thickness and said thickness of said backup sealing element thereafter increasing without subsequently decreasing in a direction toward said main sealing element.

5. The sealing assembly of claim 4, wherein said backup sealing element having a sealing contact surface close to said main sealing element as a result of said asymmetrical cross-section, thereby creating a moment to oppose the forces created by said compressing element which would otherwise tend to make said backup member extrude in the area adjacent said compressing element.

6. The sealing assembly of claim 5, wherein said positioning of said sealing contact surface on said backup element provides an extrusion-resisting force for said main sealing element by said backup sealing member.

7. The sealing assembly of claim 6, wherein:
 said radial thickness of said backup sealing element adjacent said compressing element is less than said first radial thickness of said compressing element;
 said moment in combination with said radial thickness relationship between said compressing element and said backup element acting together to minimize forces promoting extrusion therebetween.

8. The sealing assembly of claim 4, wherein said main sealing element is interference fit to said packer such that a radially inward force is built into said main sealing member, urging it to retain its original shape.

9. The sealing assembly of claim 4 wherein the majority of the length of said backup sealing element is interference fit to the packer.

10. A method of minimizing extrusion of multi-component sealing elements on a packer, comprising:
 mounting at least a backup and main sealing member to the packer;
 building in a moment into said backup element by an interference fit along the majority of its length to resist forces tending to make said backup element extrude adjacent a compressing member mounted close to it when a compressive load is applied.

11. The method of claim 10, further comprising:
 providing an asymmetrical longitudinal cross-section on the backup sealing element by having a larger cross-section adjacent said main sealing member.

12. A sealing element for a packer, mountable to a mounting surface on the packer having a radial diameter, comprising:
 a flexible tubular body having a bore therethrough and a top and bottom end;
 said tubular body having at least one external sealing surface;
 said bore sized so that at least a portion of the length of said bore in said tubular body is smaller than the radial diameter of the mounting surface, requiring an interference fit over at least a portion of said bore to mount said tubular body onto the mounting surface;
 said tubular body having an asymmetrical longitudinal cross-section; and
 said portion of said bore having said interference fit substantially opposes a portion of said body having a reduced radial thickness.

13. The sealing element of claim 12, wherein said reduced radial thickness comprises a taper.

14. The sealing element of claim 13, wherein said taper commences at said top end and truncates before said bottom end.

15. The sealing element of claim 14, wherein said external sealing surface extends primarily from said lower end to said truncated taper.

16. The sealing element of claim 15, wherein:
 said tapered surface is oriented with respect to the longitudinal axis of said bore in the range of about 2°–20°;
 the amount of partial interference is in the range of greater than 0% to about 30% of the cross-sectional thickness.

17. A sealing assembly for a packer, comprising of at least two elements acting in tandem and actuable into a sealing mode by the application of a longitudinal force, comprising:
 a compressing element;
 a main sealing element;
 a backup sealing element;
 said compressing element selectively applying a longitudinal force on said backup sealing element;
 said backup sealing element transferring said longitudinal compressive force to said main sealing element;
 said compressing element having a first radial thickness adjacent said backup sealing element;
 said backup sealing element having a longitudinally asymmetrical cross-section with its smallest radial thickness adjacent said first radial thickness;
 said backup sealing element is at least in part interference fit to the packer;
 only a portion of said longitudinal length of said backup element closest to said compressing element is interference fit;
 whereupon a moment resisting extrusion of said backup sealing element adjacent said compressing element is built into said backup sealing element, due at least in part to said partial interference fit.

18. A method of minimizing extrusion of multi-component sealing elements on a packer, comprising:
 mounting at least a backup and main sealing element to the packer;
 building in a moment into said backup element to resist forces tending to make said backup element extrude adjacent a compressing element mounted close to it when a compressive load is applied;
 lowering the sealing contact area of said backup sealing element closer to said main sealing element;
 providing an asymmetrical longitudinal cross-section on the backup sealing element to accomplish said lowering;

providing at least a part interference fit for said backup sealing element adjacent a compressing element bearing down on it;

further resisting forces tending to make said backup element extrude adjacent the compressing element by virtue Of a moment created by said interference at least in part.

19. The method of claim 18, further comprising the step of:

increasing the resistance to extrusion of said main sealing member adjacent said backup sealing member by said lowering of said sealing contract area.

20. The method of claim 18, further comprising the steps of:

using a smaller cross-section for said backup sealing member than the compressing member cross-section in the area where the compressing member applies force to said backup member;

resisting extrusion or lump formation on said backup member due to said smaller cross-section adjacent said compressing member.

21. The method of claim 20, further comprising the steps of:

providing a taper on said backup sealing member as said asymmetrical cross-section;

minimizing extrusion tendencies of said main sealing member due to said taper.

22. The method of claim 18, further comprising the steps of:

mounting said main sealing member with an interference fit;

creating a radially inward force tending to make said main sealing member regain its original shape, after a cycle of loading, due to said interference fit.

23. The method of claim 22, further comprising the step of:

containing said main sealing element against extrusion by virtue of said asymmetrical shape of said backup sealing member.

24. The method of claim 23, further comprising the step of:

resisting the tendency of said main sealing member to extrude due to said interference at least in part in the mounting of said backup sealing member.

* * * * *